United States Patent
Lavoie

(10) Patent No.: US 8,656,781 B2
(45) Date of Patent: Feb. 25, 2014

(54) METHOD AND SYSTEM FOR COMPENSATION OF ULTRASONIC SENSOR

(75) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 504 days.

(21) Appl. No.: 12/907,019

(22) Filed: Oct. 18, 2010

(65) Prior Publication Data

US 2012/0090395 A1    Apr. 19, 2012

(51) Int. Cl.
*G01N 29/32* (2006.01)
*G01S 3/82* (2006.01)

(52) U.S. Cl.
USPC ............. 73/602; 73/1.82; 367/118; 367/902; 367/909

(58) Field of Classification Search
USPC ................... 73/1.82, 602; 367/118, 902, 909
See application file for complete search history.

(56) References Cited

U.S. PATENT DOCUMENTS

| | | | | |
|---|---|---|---|---|
| 4,608,674 A * | 8/1986 | Guscott | | 367/93 |
| 4,664,216 A * | 5/1987 | Kodama et al. | | 180/233 |
| 4,831,561 A * | 5/1989 | Utsumi | | 702/150 |
| 4,943,119 A * | 7/1990 | Zarniko et al. | | 299/1.5 |
| 7,263,031 B2 * | 8/2007 | Sanoner et al. | | 367/99 |
| 8,254,209 B2 * | 8/2012 | Yamanaka et al. | | 367/99 |

* cited by examiner

*Primary Examiner* — Peter Macchiarolo
*Assistant Examiner* — Rose M Miller
(74) *Attorney, Agent, or Firm* — Joseph E. Root

(57) ABSTRACT

A system and method for compensating ultrasonic sensors mounted on a vehicle for speed of sound variations. The ultrasonic sensor is operatively coupled to a power train control module having a pressure sensor that continuously monitors atmospheric pressure and a controller configured for computing a compensated speed of sound using the monitored atmospheric pressure. The ultrasonic sensor sends an ultrasonic wave and determines the time lag in receiving the reflected ultrasonic wave from an object. Subsequently, the ultrasonic sensor generates a signal corresponding to the relative distance between the vehicle and the object using the compensated speed of sound and the time lag.

8 Claims, 2 Drawing Sheets

METHOD AND SYSTEM FOR COMPENSATION OF ULTRASONIC SENSOR

BACKGROUND

This application relates generally to the field of automobile sensors and more particularly to compensating output of ultrasonic sensors.

An obstruction detection system for a vehicle generally employs sensors such as ultrasonic sensors mounted on the vehicle body for detecting surrounding obstacles using ultrasonic waves. Conventionally, the ultrasonic sensors transmit sound waves around the vehicle and sense an obstacle through waves reflected by the obstacle. To this end, the sensor determines the time lag in receiving the reflected sound wave, and using the known speed of sound, identifies the distance between the obstacle and vehicle.

It should be understood that in dry air, at 20° C. (68° F.), the speed of sound is 343 meters per second. Weather conditions, however, affect the behavior of the sound waves, and the speed of sound varies with pressure, temperature, and humidity. Ultrasonic sensors are generally employed in a number of vehicles to provide parking assistance, collision detection, auto-parking, or any other kind of obstruction avoidance capabilities. Consequently, appropriate obstruction detection is required to avoid damaging the vehicle.

Currently, the speed of sound is compensated for atmospheric temperature variations by employing an ambient temperature sensor mounted on the vehicle. This may be expensive, however. In addition, no existing solution compensates the ultrasonic sensor for atmospheric pressure variations.

It would be highly desirable to have a cost-effective and efficient system that compensates an ultrasonic sensor for speed of sound variations arising due to atmospheric variations.

SUMMARY

One embodiment of the present application describes a system for compensating ultrasonic sensors mounted on a vehicle for variations in speed of sound. The present disclosure includes an ultrasonic sensor operatively coupled to a power train control module that compensates for atmospheric effects on the speed of sound. The power train control module includes a pressure sensor that monitors atmospheric pressure, and a controller configured for computing a compensated speed of sound using the monitored atmospheric pressure. The ultrasonic sensor sends an ultrasonic wave around the vehicle and determines the time lag in receiving the reflected ultrasonic wave from an object. Further, the ultrasonic sensor receives the compensated speed of sound corresponding to the ultrasonic wave from the power train control module. Subsequently, a signal corresponding to the relative distance between the vehicle and the object is generated using the compensated speed of sound and the time lag.

Another embodiment of the present application discloses a method for compensating an ultrasonic sensor for speed of sound variations. The method includes monitoring atmospheric pressure using a pressure sensor provided in a power train control. An ultrasonic sensor transmits ultrasonic wave and determines the time lag in receiving the reflected ultrasonic wave from an object. The method includes computing a compensated speed of sound based on the monitored atmospheric pressure and generates a signal corresponding to the relative distance between the vehicle and the object using the compensated speed of sound and the time lag.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes methods and systems for active compensation of ultrasonic sensors mounted on a vehicle based on variations in the speed of sound due to atmospheric conditions. The present disclosure employs an internal pressure sensor already included in a vehicle's power train module to adjust the speed of sound value according to atmospheric pressure variations. The pressure sensor monitors the atmospheric pressure to compute a compensated speed of sound. Subsequently, the ultrasonic sensor utilizes this compensated speed of sound to identify the relative distance between an object and the vehicle. The compensated speed of sound results in accurate distance estimation free from the effects of atmospheric variations. Using the pressure sensor already fitted in the power train control module provides a convenient and cost-effective solution to compensate ultrasonic sensors for atmospheric conditions. In addition, the present disclosure describes an active compensation process that automatically adjusts for speed of sound variation through continual pressure monitoring, requiring no manual intervention.

Exemplary Embodiments

Figure 1:
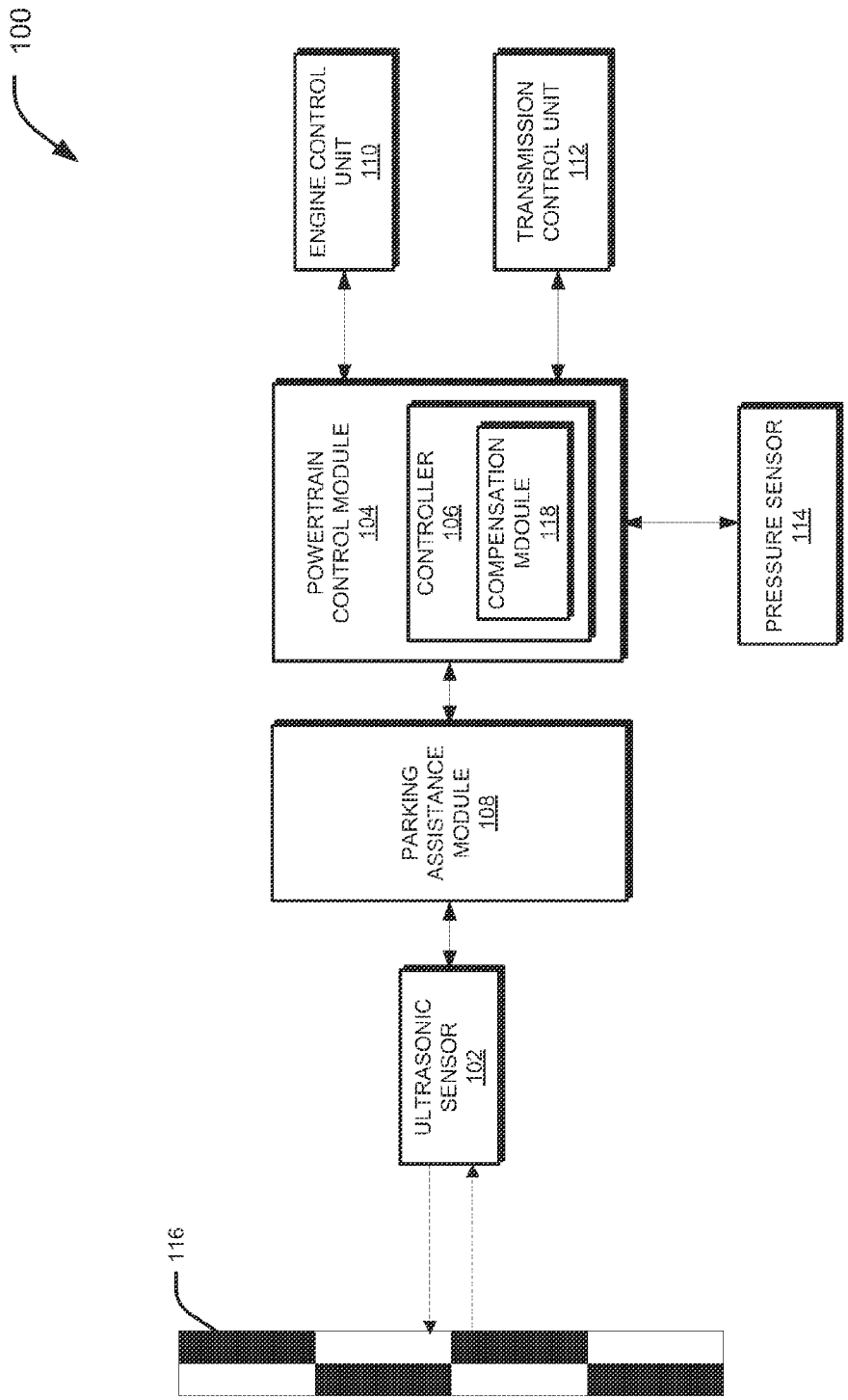
FIG. 1 is an exemplary embodiment of a compensation system that compensates ultrasonic sensors for atmospheric variations.

FIG. 1 illustrates an exemplary compensation system 100 compensating an ultrasonic sensor 102 for variations in speed of sound due to climatic conditions. The system 100 includes components of a typical vehicle including a power train control module 104 having a controller 106, and the ultrasonic sensor 102 mounted on the vehicle to provide inputs to a parking assistance module 108. The compensation system 100 described in this disclosure is generally applicable to various types of vehicles, including small or large cars, trucks, vans, SUVs, and trailers, that may employ an ultrasonic sensor.

The present disclosure uses the known capabilities of the power train control module 104 embedded within the vehicle for the compensation process. The term "power train" refers to a power generating and delivery system that includes an engine and a transmission, and is used as a drive system in an automotive vehicle. The power train control module 104 performs engine and transmission control operations using an engine control unit 110 and a transmission control unit 112, respectively. The engine control unit 110 detects data from various portions of the engine and may adjust fuel supply, ignition timing, intake airflow rate, and various other known engine operations. The transmission control unit 112 detects engine load and vehicle speed to decide a gear position to be established in the transmission. For the purpose of description, FIG. 1 depicts only a few components of the power train control module 104; those skilled in the art, however, will understand that the power train control module 104 may be operatively coupled to a number of sensors, switches, or other known devices to gather vehicle information and control various vehicle operations. A pressure sensor 114 is one of the sensors employed by the power train control module 104 to monitor atmosphere pressure.

The parking assistance module 108 provides capabilities such as auto-parking, parallel parking, obstacle identification, and so on, resulting in a convenient or completely automatic parking process. For example, using the parking assistance module 108, the vehicle can steer itself into a parking space with little or no input from the driver. In that process, the module 108 detects and warns about objects that pose a collision risk. Detection and warning are performed by a number of sensors, such as the ultrasonic sensor 102, which cooperate to determine the distance between the vehicle and surrounding objects. In one implementation, the parking assistance module 108 may include a user interface that may pictorially depict the surrounding objects including their distance from the vehicle.

The ultrasonic sensor 102 detects obstacles on either side, in the front, or the rear of the vehicle, and vehicle modules, such as the steering wheel, the brake system, the collision-warning system, the parking assistance module 108, and so on, may utilize this information. The ultrasonic sensor 102 employed in the present embodiment is coupled to the parking assistance module 108 to provide parking assistance. The ultrasonic sensor 102 may be mounted on the front or rear bumper, or on either side of the vehicle to detect surrounding obstacles.

The ultrasonic sensor 102 may include a transmitter (not shown) adapted to transmit ultrasonic waves around the vehicle, and a receiver (not shown) adapted to receive the waves reflected from any object in the vicinity of the vehicle, such as obstacle 116. An internal processor (not shown) determines the transit time elapsed between transmitting the wave and receiving the same wave reflected from the obstacle 116. Subsequently, the internal processor generates an output signal corresponding to the relative distance between the vehicle and the obstacle 116 using the formula $d=2c/t$, where c is the speed of sound and t is the transit time. This output signal may then be provided to the parking assistance module 108, for example. Such object detection capabilities of ultrasonic sensors are well known to those skilled in the art and will not be discussed in detail in the present disclosure.

The ultrasonic sensor 106 may, however, provide erroneous relative distance between the vehicle and an object, such as the obstacle 116, due to variations in environmental conditions. Inaccurate distance measurement provided by the ultrasonic sensor 102 may introduce errors in the parking assistance module 108 and may result in damage to the vehicle. Since speed of sound depends on factors such as temperature, atmospheric pressure, and humidity, it may be necessary to incorporate a correction factor based on atmospheric temperature or pressure variations. Consequently, an accurate and stable measure of the speed of sound is required.

The compensation system 100 employs the already available atmospheric pressure sensor 114 coupled to the power train control module 104 to compensate for atmospheric conditions. To this end, the atmospheric pressure sensor 114, such as a barometer, continuously measures atmospheric pressure, and a compensation module 118 is incorporated within the controller 106. The compensation module 118 is programmed to monitor the pressure conditions to ensure that any variation in pressure than may affect speed of sound is taken into account and a corresponding compensated speed of sound is computed. Compensating speed of sound for atmospheric pressure variations ensure accounting for all weather conditions that may affect the output of the ultrasonic sensor 102.

The compensated speed of sound is then provided to the ultrasonic sensor 102 to compute accurate relative distance between the vehicle and the obstacle 116, ensuring appropriate functioning of the parking assistance module 108. The compensation process is discussed in detail in the following section in connection with FIG. 2.

The power train control module 104 computes compensated speed of sound to ensure that the output of the ultrasonic sensor 102 is free from atmospheric variations. Since the pressure sensor 114 continuously monitors the atmospheric pressure, the compensation system 100 automatically adjusts the speed of sound with no manual intervention.

In an alternate embodiment of the present invention, an ambient temperature sensor employed by the vehicle may also be coupled to the controller 106 to compute variation in speed of sound based on temperature. Those skilled in the art will understand that either pressure or temperature compensation may ensure appropriate functioning of the ultrasonic sensor 102. The combination of the pressure and temperature sensor may be utilized in situations where the pressure sensor 114 fails, and the temperature sensor assists in compensation to provide robustness to the parking assistance module 108.

In another embodiment of the present disclosure, the system 100 may use a mass airflow sensor coupled to the power train control module 104 to compensate speed of sound for atmospheric conditions. Those skilled in the art will understand that the mass airflow sensor is employed to detect the mass of air entering a combustion engine. As the air mass changes with temperature, the airflow mass measured by the sensor may determine any ambient temperature variations. Subsequently, this temperature variation information may be utilized by the power train control module 104 to compute compensated speed of sound.

As a result, the system 100 may utilize any combination of sensing or estimation for temperature, pressure, and air mass to provide a robust compensation of speed of sound through air.

Figure 2:
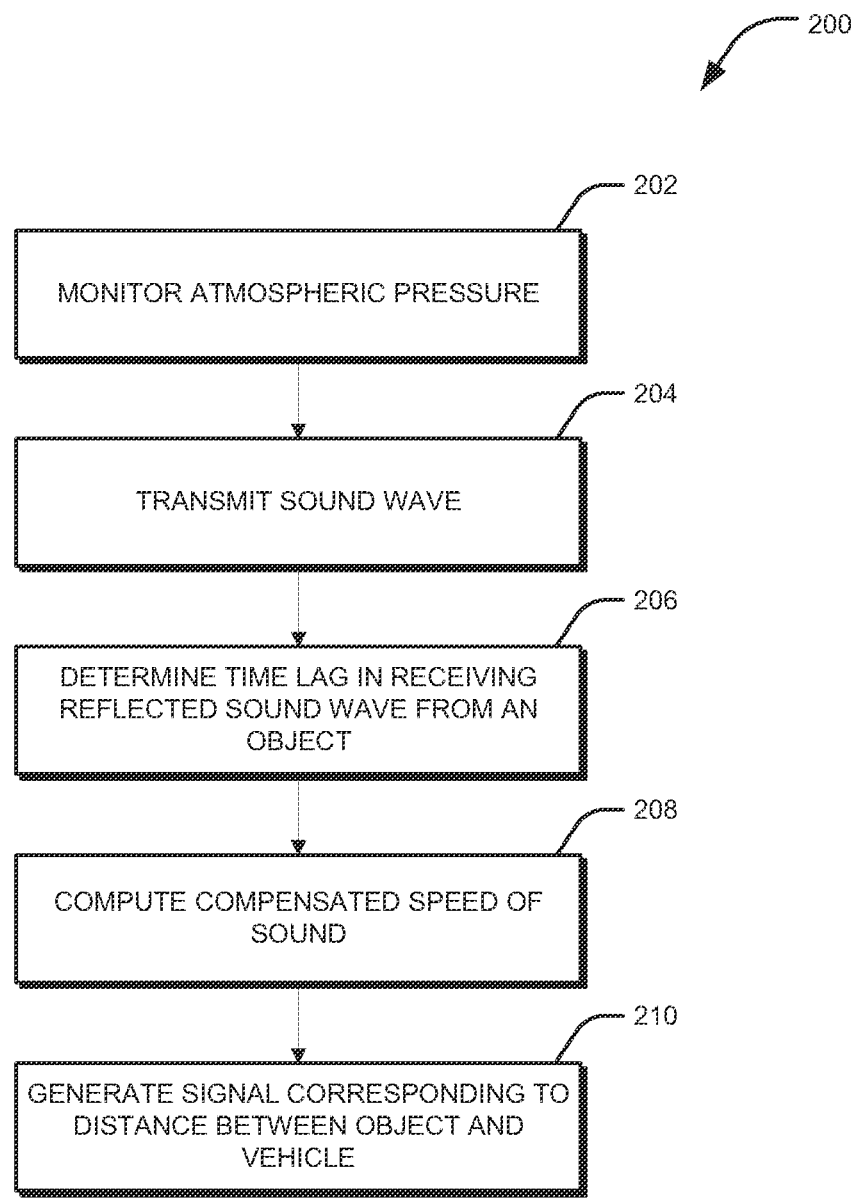
FIG. 2 illustrates an exemplary embodiment of a method for compensating the ultrasonic sensor output (FIG. 1) based on variations in the speed of sound.

FIG. 2 outlines a method 200 for carrying out the subject matter of the present disclosure. The method 200 includes steps 202 to 210 describing a process for automatically compensating the output of the ultrasonic sensor 102 for variations in speed of sound.

Consider an example of the vehicle using the parking assistance module 108 to steer the vehicle into a parking spot. The method 200 begins at step 202, where the atmospheric pressure sensor 114 monitors the atmospheric pressure conditions. The step 202 is a continuous step involving continuous atmospheric pressure monitoring by the pressure sensors 114, while the vehicle is turned "on". At step 204, the ultrasonic sensor 102 transmits sound waves within the vicinity of the vehicle to identify obstacles surrounding the parking slot that may pose a collision risk. In one implementation, the ultrasonic sensor 102 may be mounted on the rear bumper of the vehicle to detect obstacles behind the vehicle, and determine appropriate distance between the vehicle and the obstacles.

Next, at step 206, the ultrasonic sensor 106 determines the sound wave transit time that defines the time lag between the sound wave transmission and in the reception of the sound wave reflected from obstacle such as obstacle 116. At the same time, at step 208, the compensation module 118 computes a compensated speed of sound adjusting for atmospheric pressure variations. To this end, the compensation module 118 identifies the variation in the atmospheric pressure during the transit time to calculate the compensated speed of sound. Subsequently, the compensated speed of sound is provided to the ultrasonic sensor 102.

It should be understood that the speed of sound is compensated for atmospheric pressure variation based on the known dependency of sound wave on atmospheric pressure. In an embodiment of the present disclosure, the compensated speed of sound is computed using the following formula:

$$c^2 = \gamma P/\rho \qquad (1)$$

c is the speed of sound, P is the atmospheric pressure, $\rho$ is the density of air, and $\gamma$ the adiabatic index also known as the isentropic expansion factor. Those in the art understand that $\gamma$ is the ratio of specific heats of a gas at a constant-pressure to a gas at a constant-volume (Cp/Cv).

At step 210, the ultrasonic sensor 106 generates an output signal corresponding to the distance between the vehicle and the obstacle 116 based on the transit time and the compensated speed of sound. Consequently, the ultrasonic sensor 102 provides this signal to the parking assistance module 108, which may warn a driver about all identified obstacles surrounding the vehicle. Alternatively, using this signal, the parking assistance module 108 may automatically steer the vehicle appropriately into the parking spot, without damaging the vehicle. Using the compensated speed of sound prevents erroneous obstacle detection by ultrasonic sensors, making the associated parking assistance module 108 robust and efficient.

Those skilled in the art will understand that the steps set out in the discussion above may be combined or altered in specific adaptations of the disclosure. The illustrated steps are set out to explain the embodiment shown, and it should be anticipated that ongoing technological development will change the manner in which particular functions are performed. These depictions do not limit the scope of the disclosure, which is determined solely by reference to the appended claims.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

I claim:

1. A system compensating ultrasonic sensors mounted on a vehicle for speed of sound variations, the system comprising:
a power train control module including:
  a pressure sensor configured for monitoring atmospheric pressure; and
  a controller configured for computing a compensated speed of sound using the monitored atmospheric pressure to compensate for atmospheric variations;
an ultrasonic sensor operatively coupled to the power train control module, the ultrasonic sensor being configured for:
  transmitting an ultrasonic wave;
  determining the time lag in receiving the reflected ultrasonic wave from an object;
  receiving the compensated speed of sound corresponding to the ultrasonic wave;
  generating an output signal corresponding to the relative distance between the vehicle and the object using the compensated speed of sound and the time lag; and
a parking assist module, operating at least in part based on the output of the ultrasonic sensor and the relative distance between the vehicle and the object.

2. The system of claim 1, wherein the pressure sensor continuously monitors the atmospheric pressure.

3. The system of claim 1, wherein the power train control module further includes an ambient temperature sensor to compensate for temperature variations on the speed of sound.

4. The system of claim 3, wherein the ambient temperature sensor is employed in case the pressure sensor is non-operational.

5. A method for compensating an ultrasonic sensor mounted on a vehicle for atmospheric pressure variations, the method comprising:
providing a power train control module having a pressure sensor;
monitoring atmospheric pressure using the pressure sensor;
transmitting an ultrasonic wave from the ultrasonic sensor;
determining the time lag in receiving the reflected ultrasonic wave from the object;
computing a compensated speed of sound based on the monitored atmospheric pressure;
generating an output signal corresponding to the relative distance between the vehicle and the object using the compensated speed of sound and the time lag; and
assisting in parking the vehicle, employing a parking assist module operating at least in part based on the output signal corresponding to the relative distance between the vehicle and the object.

6. The method of claim 5, wherein the monitoring step involves continuously monitoring the atmospheric pressure.

7. The method of claim 5, wherein the computing step uses the pressure sensor output monitored within the time lag.

8. The method of claim 7, wherein the compensated speed compensates for variation in the speed of sound due to atmospheric pressure variations.

* * * * *